US011500642B2

(12) United States Patent
Battle et al.

(10) Patent No.: US 11,500,642 B2
(45) Date of Patent: Nov. 15, 2022

(54) ASSIGNMENT OF MICROPROCESSOR REGISTER TAGS AT ISSUE TIME

(71) Applicant: International Business Machines Corporation, Armonk, NY (US)

(72) Inventors: Steven J. Battle, Philadelphia, PA (US); Jentje Leenstra, Bondorf (DE); Brian D. Barrick, Pflugerville, TX (US); Dung Q. Nguyen, Austin, TX (US); Brian W. Thompto, Austin, TX (US)

(73) Assignee: International Busines Machines Corporation, Armonk, NY (US)

( * ) Notice: Subject to any disclaimer, the term of this patent is extended or adjusted under 35 U.S.C. 154(b) by 36 days.

(21) Appl. No.: 17/093,757

(22) Filed: Nov. 10, 2020

(65) Prior Publication Data

US 2022/0147359 A1 May 12, 2022

(51) Int. Cl.
*G06F 9/30* (2018.01)
*G06F 9/38* (2018.01)
*G06F 9/48* (2006.01)

(52) U.S. Cl.
CPC .......... *G06F 9/384* (2013.01); *G06F 9/30047* (2013.01); *G06F 9/30101* (2013.01); *G06F 9/3855* (2013.01); *G06F 9/4843* (2013.01)

(58) Field of Classification Search
CPC .. G06F 9/384; G06F 9/30047; G06F 9/30101; G06F 9/3855; G06F 9/4843
See application file for complete search history.

(56) References Cited

U.S. PATENT DOCUMENTS

| | | | |
|---|---|---|---|
| 7,765,384 B2 | 7/2010 | Le et al. | |
| 9,207,995 B2 | 12/2015 | Boersma et al. | |
| 9,286,068 B2 | 3/2016 | Abernathy et al. | |
| 9,286,072 B2 | 3/2016 | Gschwind et al. | |
| 10,073,699 B2 | 9/2018 | Eisen et al. | |
| 2020/0042322 A1 | 2/2020 | Wang et al. | |
| 2020/0097296 A1* | 3/2020 | Priyadarshi | G06F 9/3861 |
| 2020/0201639 A1 | 6/2020 | Bowman et al. | |
| 2020/0278867 A1* | 9/2020 | Liu | G06F 9/3818 |
| 2020/0310815 A1 | 10/2020 | Ayupov et al. | |

OTHER PUBLICATIONS

Monreal et al., "Dynamic Register Renaming Through Virtual-Physical Registers," http://www.jilp.org/vol2/v2paper10.pdf, accessed Aug. 5, 2020, 20 pgs.
Unknown, "Method to Restore Slice-Target-Register-File (STF) Tag for Transaction Memory Processing," https://priorart.ip.com/IPCOM/000261828, IP.com Prior Art Database, IPCOM000261828D, Apr. 8, 2020, 3 pgs.
International Search Report and Written Opinion, International Application No. PCT/IB2021/060215, Feb. 7, 2022, 9 pgs.

* cited by examiner

*Primary Examiner* — Corey S Faherty
(74) *Attorney, Agent, or Firm* — Robert J. Shatto

(57) ABSTRACT

Provided is a method for assigning register tags to instructions at issue time. The method comprises receiving an instruction for execution by a microprocessor. The method further comprises dispatching the instruction to an issue queue without assigning a register tag to the instruction. The method further comprises determining that the instruction is ready to issue. In response to determining that the instruction is ready to issue, the method comprises assigning an available register tag to the instruction. The method further comprises issuing the instruction.

20 Claims, 5 Drawing Sheets

ASSIGNMENT OF MICROPROCESSOR REGISTER TAGS AT ISSUE TIME

BACKGROUND

The present disclosure relates generally to the field of computing, and more particularly to assigning register tags to instructions being executed by a microprocessor at issue time.

A microprocessor is a computer processor that incorporates the functions of a central processing unit on one or more integrated circuits (ICs). Processors execute instructions (e.g., store instructions) based on a clock cycle. A clock cycle, or simply "cycle," is a single electronic pulse of the processor.

SUMMARY

Embodiments of the present disclosure include a method, computer program product, and system for assigning register tags to instructions at issue time. The method comprises receiving an instruction for execution by a microprocessor. The method further comprises dispatching the instruction to an issue queue without assigning a register tag to the instruction. The method further comprises determining that the instruction is ready to issue. In response to determining that the instruction is ready to issue, the method comprises assigning an available register tag to the instruction. The method further comprises issuing the instruction.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
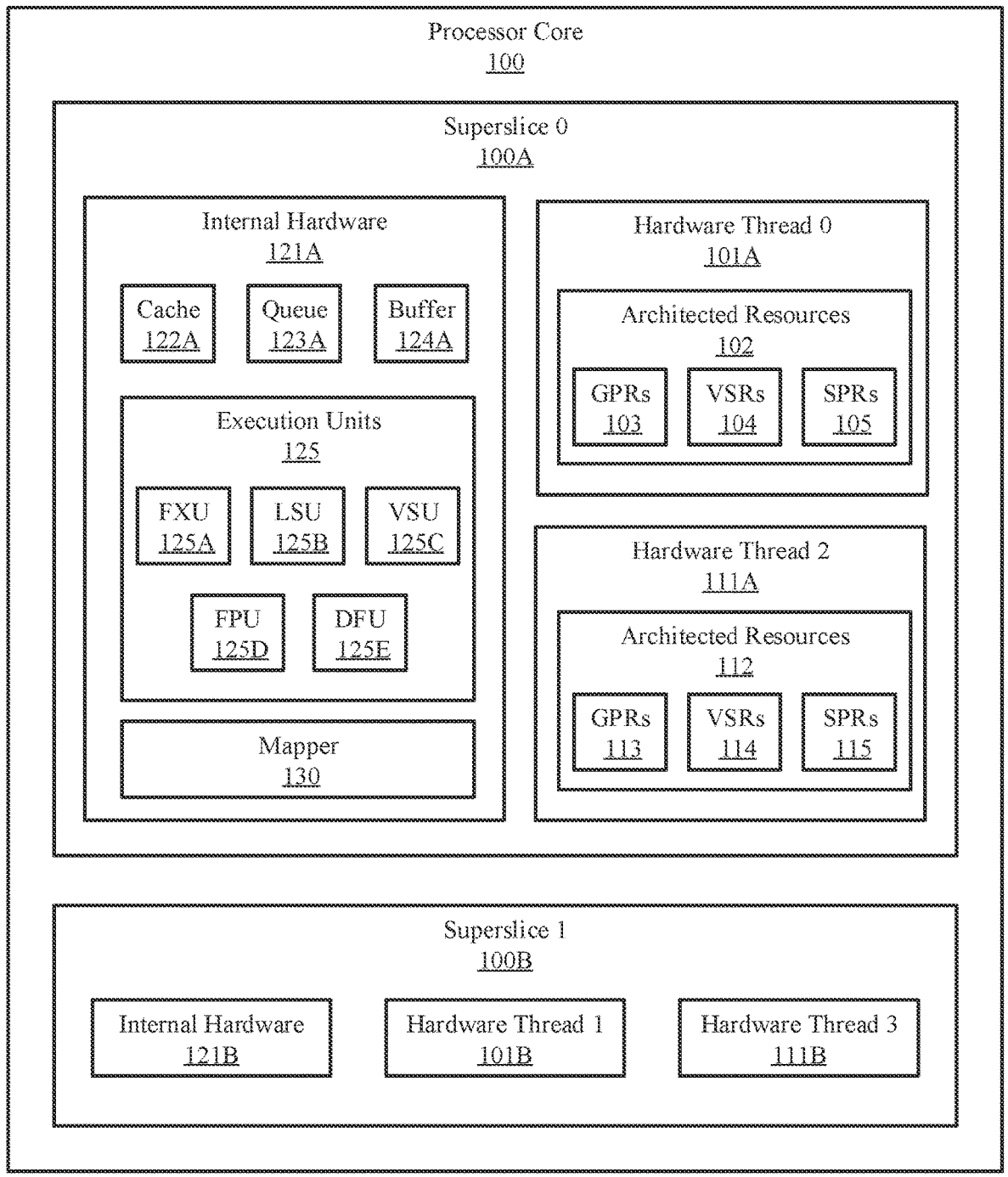
FIG. 1 illustrates a block diagram of a processor core, in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing, and in particular to assigning register tags to instructions being executed by a microprocessor at issue time. While the present disclosure is not necessarily limited to such applications, various aspects of the disclosure may be appreciated through a discussion of various examples using this context.

Microprocessor architectures utilizes a variety of registers to store data for execution/manipulation by instructions. In order to track which registers (or locations within registers) store data for particular instructions, microprocessor utilize a register file (or more than one register file). The register file holds the register locations needed for various instructions being executed by the hardware threads in the superslice. In some processors, the register file may be broken up into blocks. For example, in some POWER® processors, the register file is called a Slice Target Register File (STF), and it is composed of four smaller STF blocks working together to provide the core with a large register file. (POWER is a registered trademark owned by International Business Machines Corporation).

In order to ensure that multiple instructions do not attempt to store different data in the same location, the microprocessor assigns register tags (e.g., STF tags) to instructions. Unused register tags can be kept in a free list (e.g., STF free list). When an instruction is received at dispatch, the processor checks for available registers. If a register is available, the processor assigns a register tag from the free list to the instruction, and the instruction is able to proceed with the associated tag. Once a register tag is assigned, it is removed from the free list, and its corresponding entry in the register file (and, therefore, register location) cannot be assigned to a new instruction. The use of register tags and a register files allows the processor to ensure that instructions do not collide (e.g., overwrite data still needed by another instruction).

In traditional processor architectures, register tags (and, accordingly, entries in the register file) are assigned to instructions relatively early in the pipeline, often during instruction dispatch, and in any case prior to the instruction being sent to the issue queue (ISQ). As a result, register tags are assigned to instructions, and therefore not available to other instructions, for a relatively long time. This can result in high register file usage, and some instructions may have to wait for an unnecessarily long amount of time for a register tag to become free.

Embodiments of the present disclosure may overcome these and other problems with traditional microprocessor architectures by assigning register files at issue time. Accordingly, these embodiments shrink the window where the register has to be allocated. This allows instructions to be dispatched into the issue queue and wait for the register tag.

In some embodiments, dispatch logic in the processor may write an instruction tag (ITAG) for a received instruction into a mapper. Additionally, the old ITAG may be pushed to a save and restore buffer (SRB). The SRB tracks prior mappings for a given register. For example, if the processor writes to a particular general purpose register (GPR), such as GPR3, five times, the mapper only has youngest one, while the SRB will store the five historical ITAGs. The purpose of the SRB is to back up the processor state in the event that the processor has to perform a flush.

The dispatch logic also dispatches the instructions to the ISQ. In some embodiments, these operations are performed without a register tag being assigned to the instructions.

The instruction waits in the ISQ without a register tag until it nears issue time. At issue time, register tag allocation logic in the processor assigns a free register tag to the instruction. The processor also broadcasts the ITAG and register tag of the instruction to the ISQ and the mapper. The mapper identifies the matched location using the received ITAG and writes in the assigned register tag. The mapper also sets the ready bit (W, e.g., by setting W=1) for the instruction. The ready bit indicates whether the data is in the register and the instruction is ready to execute. Similarly, at the ISQ, the matched location is identified, the assigned register tag is written at the source location, and the ready bit is set. The register tag is also written in at the matched location in the SRB, and the ready bit is set in the SRB. The instruction is then executed.

If an instruction reaches issue time and there is no register tag available, then the instruction is prevented from issuing until a register tag is available. In some embodiments, an entry in the register file is kept free to prevent a situation where the next to complete (NTC) instruction does not have an available register entry. If the NTC instruction does not have a register tag, this reserve entry can be assigned to the NTC instruction to allow it to issue. If a hang does occur (e.g., no register tags are freed up by issuing instructions), a flush is performed to clear out and reclaim in-flight register tags. In some embodiments, a mini-hang buster may be performed by clearing out only some register tags instead of performing a full flush.

Performing register tag allocation at issue has numerous advantages when compared to existing architectures. For example, the complexity in the dispatch can be reduced because register file availability does not need to be considered during dispatch. Additionally, late allocation of register tags results in a more efficient usage of the register file entries because the processor knows that results will come back by issuing the instruction. Furthermore, the number of register file entries that are needed, and therefore the physical size of the register file, can be reduced, or, if the size of the register file is not reduced, deeper speculation can be enabled. In other words, embodiments of the present disclosure can enable a system having the same register file size to have deeper out-of-order windows, or go deeper down a predicted branch path before resolving the path. The free list can also be physically placed closer to the ISQ and/or Vector/Scalar Unit (VSU), and the ITAG free list no longer needs to care about register file hole count, which should help the dispatch to complete overall pipeline. Finally, embodiments of the present disclosure can make reuse of the logic already setting the valid bit in ISQ.

Embodiments of the present disclosure will now be discussed with reference to the figures. It is to be understood that while the embodiments of the present disclosure are generally discussed with reference to POWER® processors, this is done for illustrative purposes. The present disclosure may be implemented by other processor architectures, and the disclosure is not to be limited to POWER processors.

As used herein, a "producer" is an operation/instruction that the dispatched instruction is dependent on. For example, if a first operation writes to GPR3 and then a second operation reads from GPR3, the first operation is considered the producer of the second operation. Accordingly, the producer ITAG is the ITAG of the producer instruction.

As used herein, "source STF tags" are the STF tags that identify what physical registers the instructions are reading to perform their operations. The source STF tags are inside the ISQ 330 before the instruction is starting to issue. The "destination STF tag" is the STF tag associated with the register that the instruction is actually writing to. The destination STF tag is fed back in to ISQ 330, mapper 320, and SRB 340 for instructions that have not issued out and are dependent on it. For example, assume there are back to back instructions that use a particular register (REG1). The first instruction write to REG1, and the second instruction reads from REG1 and performs some operation on the data read from REG1. The destination STF tag for the first instruction is fed back into the ISQ 330, mapper 320, and SRB 340 so that the second instruction can identify the proper register to read the data from. In other words, the destination STF tag for the first instruction acts as the source STF tag for the second instruction.

Similarly, the "source ITAG" for a particular instruction is the ITAG of the instruction that the particular instruction is dependent on. In other words, the source ITAG is the ITAG for a producer. Likewise, the "destination ITAG" is the ITAG of the instruction itself. As such, the destination ITAG of a first instruction acts as the source ITAG for any instructions that are dependent on (e.g., read the data stored by) the first instruction.

Turning now to the figures, FIG. 1 illustrates a block diagram of a processor core 100, in accordance with embodiments of the present disclosure. In some embodiments, the processor core 100 may be part of a multi-core central processing unit (CPU). In other embodiments, the processor core 100 may be part of a single core CPU. The processor core 100 may support simultaneous multithreading (SMT). As such, each processor core 100 may be capable of executing multiple hardware threads. For example, the processor core 100 shown in FIG. 1 supports SMT-4 mode (e.g., with four hardware threads per core).

Within a core, hardware threads may be divided into superslices, which are groups of slices that share some hardware. For example, an SMT-4 processor can include four hardware threads divided into two different superslices, with each superslice having the hardware and architected resources necessary for two hardware threads to operate independently from the hardware threads found in a different superslice. In other words, each superslice may operate independently from other superslices. Accordingly, each superslice may maintain its own register file.

The processor core 100 includes two superslices 100A, 100B. The first superslice 100A (also referred to as superslice 0) may include internal hardware 121A (also referred to as micro-architecture resources) and two hardware threads 101A, 111A. Similarly, the second superslice 100B (also referred to as superslice 1) may include internal hardware 121B and two hardware threads 101B, 111B. The internal hardware 121A, 121B (collectively or individually referred to herein as internal hardware 121) may be substantially similar or the same for each superslice. Similarly, the first hardware threads 101A, 101B (collectively or individually referred to herein as first hardware thread(s) 101) and the second hardware threads 111A, 111B (collectively or individually referred to herein as second hardware thread(s) 111) in each superslice 100A, 100B may be substantially similar or the same for each superslice. Additionally, while not shown in FIG. 1, the processor core 100 may contain some components that are outside (i.e., common to) the superslices 100A, 100B. For example, the processor core 100 may contain an instruction fetch unit (IFU) that feeds both superslices 100A, 100B.

The internal hardware 121 may include execution units 125. The execution units 125 may include one or more fixed-point units (FXU) 125A, load-store units (LSU) 125B, vector/scalar unit (VSU) 125C, floating point units (FPU) 125D, and decimal floating units (DFU) 125E. In some embodiments, the processor core 100 may include other execution units, such as cryptographic units, condition register units, and/or branch register units, among others.

The internal hardware 121 may also include, for example, one or more caches 122, issue queues 123, buffers 124, and/or branch prediction units (not shown). The caches 122 may be a multi-level hierarchical caches. For example, each core in a processor (e.g., processor core 100) may have its own L1 cache. The L1 cache may be shared by all hardware threads (e.g., the first hardware thread 101 and the second hardware thread 111) within the processor core. The cores may also have access to L2 and L3 caches, which may be shared with other processor cores and/or between super-slices within the same core.

The internal hardware 121 also includes a mapper 130, which is responsible for managing STF tags for the hardware threads 101, 111.

The hardware threads 101 and 111 may each have their own set of architected resources 102 and 112, respectively. The architected resources 102 and 112 may include one or more registers that are dedicated to a specific hardware thread. For example, the architected resources 102 and 112 may include one or more sets of general purpose registers (GPRs) 103 and 113, floating point registers (FPRs) 104 and 114, and special purpose registers (SPRs) 105 and 115. In some embodiments, the FPRs 104 and 114 may support storing floating point vectors. In these embodiments, the FPRs 104 and 114 may be vector/scalar registers (VSRs).

Because the processor core 100 supports SMT with four hardware threads, it may be referred to as supporting SMT-4 or being an SMT-4 processor core. While the processor core 100 illustrated in FIG. 1 is an SMT-4 processor core, other types of processor cores otherwise consistent with the present disclosure are contemplated. For example, in some embodiments an SMT-2 (two hardware threads per core) or SMT-8 (eight hardware threads per core) processor may be used in implementing one or more of the methods disclosed herein.

Figure 2:
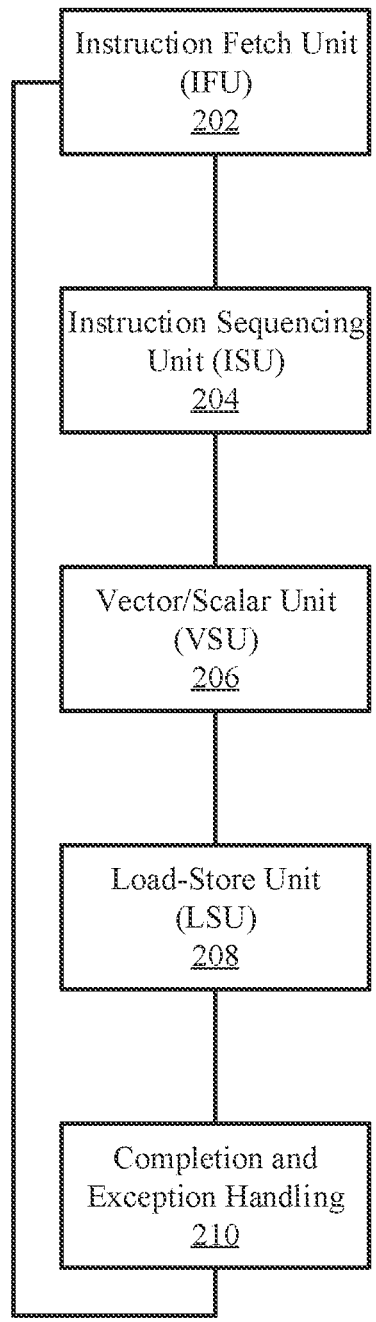
FIG. 2 illustrates a high level block diagram of various components of an example processor microarchitecture, in accordance with embodiments of the present disclosure.

Referring now to FIG. 2, illustrated is a high level block diagram of various components of an example microprocessor 200, in accordance with embodiments of the present disclosure. The microprocessor 200 includes an instruction fetch unit (IFU) 202, an instruction sequencing unit (ISU) 204, a load-store unit (LSU) 208, a vector/scalar unit (VSU) 206, and completion and exception handling logic 210.

The IFU 202 is a processing unit responsible for organizing program instructions to be fetched from memory, and executed, in an appropriate order. IFU 202 is often considered to be part of the control unit (e.g., the unit responsible for directing operation of the processor) of a central processing unit (CPU).

The ISU 204 is a computing unit responsible for dispatching instructions to issue queues, renaming registers to support out-of-order execution, issuing instructions from issue queues to execution pipelines, completing executing instructions, and handling exceptions. The ISU 204 includes an issue queue that issues all of the instructions once the dependencies are resolved. The ISU 204 may also include logic for assigning STF tags to instructions in the issue queue at issue time.

The VSU 206 is a computing unit that maintains ownership of a slice target file (STF). The STF holds all of the register data sourced by the instructions. Taking a store instruction that does not have a target as an example, the STF holds the registers needed for the store address operands and the store data that is sent to the LSU 208 for execution. The VSU 206 includes the FXU (e.g., FXU 125A), VSU (e.g., VSU 125C), FPU (e.g., FPU 125D), and DFU (e.g., DFU 125E).

The LSU 208 is an execution unit responsible for executing all load and store instructions, managing the interface of the core of the processor with the rest of the systems using a unified cache, and performing address translation. For example, the LSU 208 generates virtual addresses of load and store operations, and it loads data from memory (for a load operations), or stores data to the memory from registers (for a store operation). The LSU 208 may include a queue for memory instructions, and the LSU 208 may operate independently from the other units.

The completion and exception handling logic 210 (hereinafter "completion logic" 210) is responsible for completing the instructions. If the instruction causes an exception, the completion logic 210 flushes the instruction and signals to the IFU to re-fetch the instruction.

It is to be understood that the components 202-210 shown in FIG. 2 are provided for illustrative purposes and to explain the principles of the embodiments of the present disclosure. Some processor architectures may include more, fewer, or different components, and the various functions of the components 202-210 may be performed by different components in some embodiments. For example, the exception and completion handling may be performed by the ISU 204.

Additionally, processors may include more than one of the components 202-210. For example, a multi-core processor may include one or more instruction fetch units (IFUs) 202 per core. Furthermore, while the embodiments of the present disclosure are generally discussed with reference to POWER® processors, this is done for illustrative purposes. The present disclosure may be implemented by other processor architectures, the disclosure is not to be limited to POWER processors.

Figure 3:
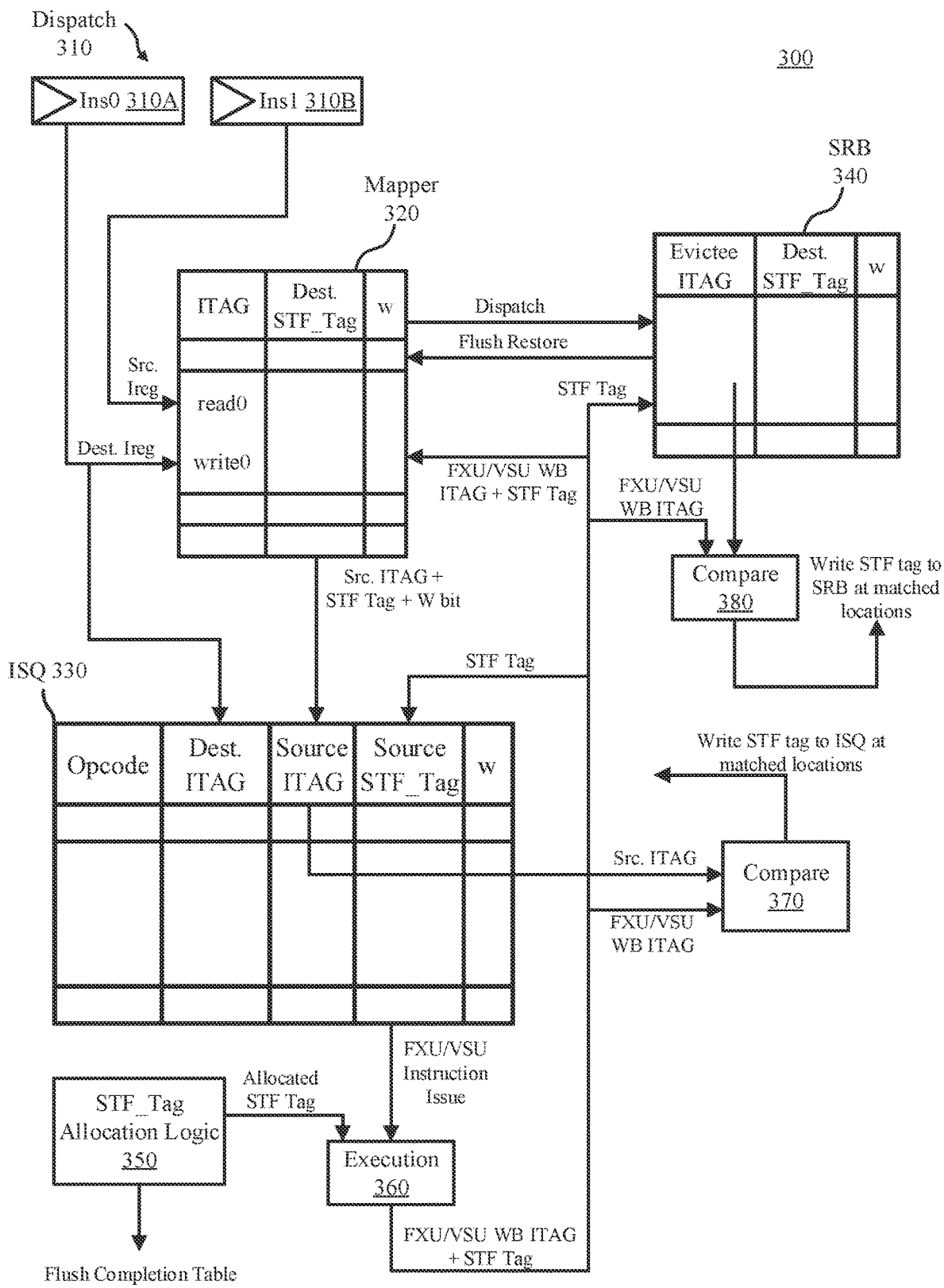
FIG. 3 illustrates a block diagram of an example microarchitecture of a processor configured to assign register tags at issue time, in accordance with embodiments of the present disclosure.

Referring now to FIG. 3, illustrated is a block diagram of an example microprocessor 300 configured to assign an STF tag to an instruction at issue time, in accordance with embodiments of the present disclosure. The microprocessor 300 includes a dispatch 310, a mapper 320, an issue queue (ISQ) 330, a save and restore buffer (SRB) 340, STF tag allocation logic 350, execution logic 360, and compare logic 370, 380. While the various components in FIG. 3 are shown as standalone components, it is to be understood that various components may actually be subcomponents of a larger component. For example, the dispatch 310 and the mapper 320 may be part of the ISU 204.

In current designs, the STF tags are allocated at dispatch time, which can put significant pressure on dispatch's 310 STF hole count timing. This also requires a deeper STF tag pool because the STF tags are allocated early in the pipeline, and thus can stay in use for a much longer time.

In embodiments of the present disclosure, however, the STF tags are allocated at issue time. This reduces the time that the STF tag must exist in the pipeline. This design leads to a reduction in timing pressure related to Dispatch's STF tag hole count, and also can lead to a smaller STF regfile (RF) design since the amount of STF tags needed by the execution pipes is also reduced.

The dispatch 310 includes two dispatch lanes 310A and 310B for dispatching instructions (e.g., FXU/VSU). The dispatch 310 dispatches the instruction to the ISQ 330. The dispatch 310 also sends logical registers to the mapper 320 to be mapped to STF tags. The logical register written by the instruction along with its ITAG are written to the mapper 320 at dispatch time. Additionally, the previous writer of the logical register (e.g., GPR) is moved to the SRB 340. This includes moving the old ITAG along with its W (written) bit and its STF tag (if it has been written). When the instruction is dispatched, the new ITAG is written, and the old ITAG is pushed to the SRB, the destination STF tag is not yet allocated to the instruction.

The dispatch 310 reads the mapper 320 to identify the producer ITAG and the source STF tag(s). If the ready bit (W) is set (e.g., =1), then the producer is already executed, and the source STF tag for the producer has been allocated. In this case, the source STF tag for the producer is read out of the mapper 320, and it is then written to the ISQ 330 as the source STF tag for the instruction. If the ready bit (W) is not set (e.g., =0), then the producer has not yet executed, and the data at the source STF tag is not ready for the current instruction to use (e.g., because the producer instruction has not completed executing yet). In this case, the source STF tag is not valid in the ISQ 330. Accordingly, the instruction will wait in the ISQ 330 until its producer is executed and the STF tag for it is allocated. It is to be understood that this is a simplified example for illustrative purposes, and that there is normally more than one source register, and each source register may have different producer instructions.

The dispatch 310 writes the instruction to the ISQ 330 as normal. At issue time, if an STF tag is available, the instruction is sent to execution logic 360 for execution. Additionally, STF tag allocation logic 350 allocates an STF tag to the instruction. The STF tag allocation logic 350 may contain an STF free list that it uses to determine whether and what STF tags are available. The execution logic 360 then issues the instruction.

After the instruction is executed, at execution write back time, the producer ITAG and the allocated STF tag (i.e., the destination STF tag for the issuing instruction) are broadcasted to the mapper 320, the ISQ 330, and the SRB 340. The mapper 320 and SRB 340 must contain the allocated STF tag so that dependent instructions can obtain a valid source STF on dispatch. The following actions performed at the mapper 320, the ISQ 330, and the SRB 340 following receipt of the producer ITAG and the allocated STF tag:

At the mapper 320, the GPR/VSR producer ITAG is compared to the ITAGs in the mapper 320. This is done using compare logic (e.g., compare logic 370 or compare logic 380). At matched locations (i.e., locations where the producer ITAG matches the ITAG for an instruction in the mapper 320), the STF tag is written to the mapper 320 entries, and the ready bit is set (e.g., set W=1) to indicate that the data needed by the instruction is stored in the register.

At the ISQ 330, the GPR/VSR producer ITAG is compared to the source ITAGs in the ISQ 330. This is done using compare logic 370. At matched locations (i.e., locations where the producer ITAG matches the source ITAG for an instruction in the ISQ 330), the STF tag is written to the source STF tag field, and the ready bit is set (e.g., set W=1).

At the SRB 340, the GPR/VSR producer ITAG is compared to the ITAGs in the SRB 340. This is done using compare logic 380. At matched location (i.e., locations where the producer ITAG matches the ITAG for an instruction in the SRB 340), the STF tag is written to the SRB 340, and the ready bit is set (e.g., set W=1).

At issue time, if no STF tag is available, then the ISQ 330 will stop issue of the instruction and wait for an STF tag to become available. If issue is hung because the oldest instruction in the issue queue cannot be issued due to a lack of available STF tags, then a flush can be performed to flush out younger (i.e., newer) instructions to reclaim some STF tags. When the STF tags are reclaimed and available for the ISQ 330 to use, then the ISQ 330 can resume issuing instructions.

In some embodiments, the completion logic (e.g., which may be the same logic as the STF tag allocation logic 350) does not perform an NTC flush since that will clear out all instruction in the pipe and can result in wasted work. For this type of flush (also referred to herein as a mini-hang buster), the completion logic will only need to flush out some youngest instructions from the Head Pointer—N (where N is the number of instructions to flush out) to clear out enough STF tags for the ISQ 330 to continue to make issue instructions.

In some embodiments, a flush request may be issued when an instruction that is ready to issue does not have an available STF tag. The flush request may cause some number of younger instructions to be flushed. In some embodiments, the microprocessor 300 may have numerous flush modes. For example, the microprocessor 300 may be configured to perform a flush after the NTC instruction has not received a tag for a given number of cycles. The microprocessor 300 may additionally, or alternatively, be configured to perform a flush if it determines that instructions are not executing at an expected rate (e.g., instructions are trickling out of the ISQ 330, which may indicate a lack of available STF tags). In some embodiments, the microprocessor 300 may be configured to perform a flush in response to the number of STF tags available in the free list being below a threshold. In some embodiments, the microprocessor 300 may considered a combination of the above (with or without other considerations) when determining whether to perform a flush. The type of flush (e.g., a full flush versus a mini-hang buster) may be determined based on which flush criterion is satisfied and/or the extent of the identified problem.

After a flush, data may be read from the SRB 340 to the mapper 320 to restore a previous state of the microprocessor 300.

Figure 4:
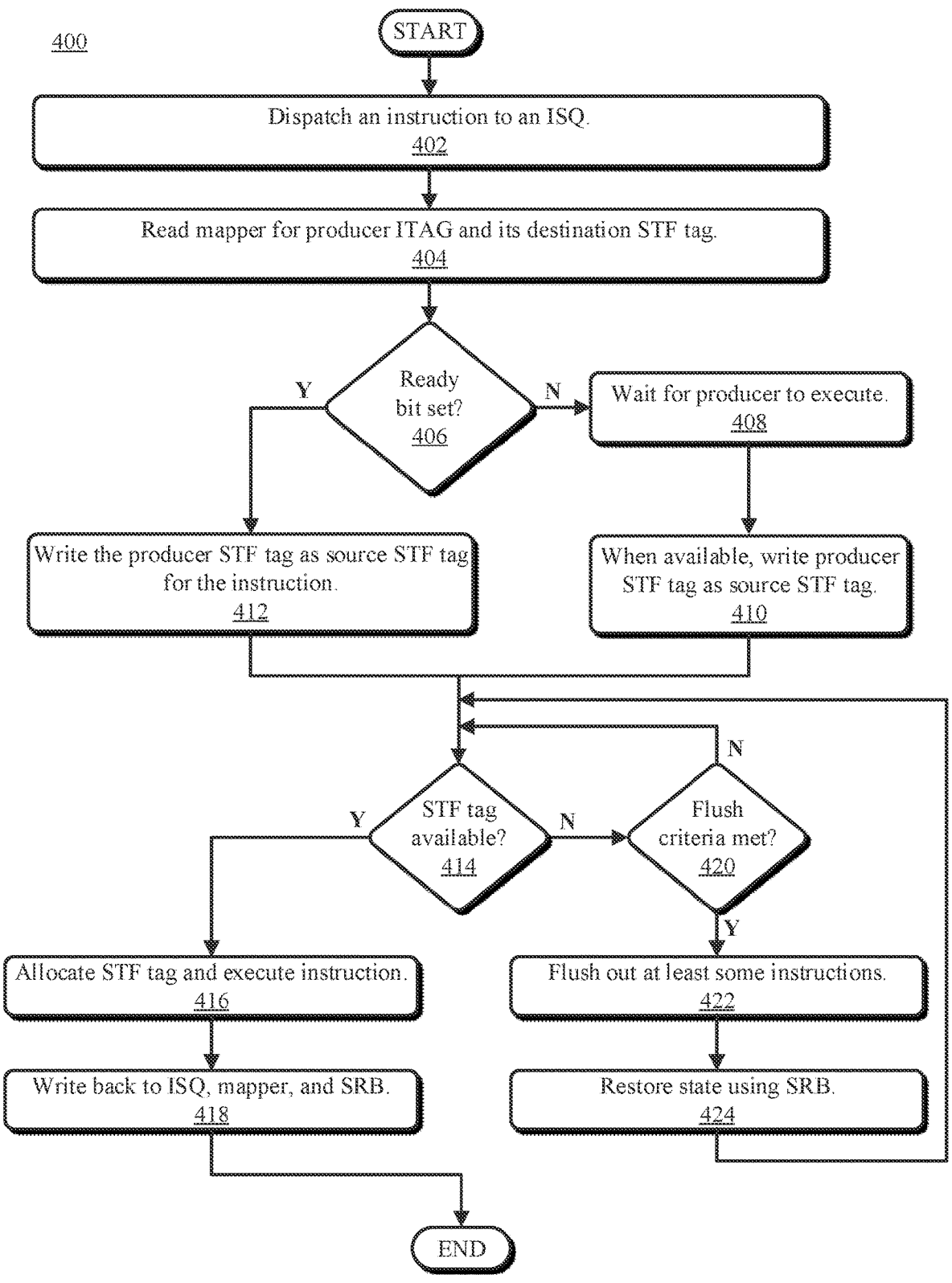
FIG. 4 illustrates a flowchart of an example method for assigning register tags to instructions at issue time, in accordance with embodiments of the present disclosure.

Referring now to FIG. 4, illustrated is a flowchart of an example method 400 for assigning STF tags at issue time, in accordance with embodiments of the present disclosure. The method 400 may be performed by hardware, firmware, software executing on a processor, or any combination thereof. For example, one or more operations of the method 400 may be performed by a processor (e.g., microprocessor 300 shown in FIG. 3). The method 400 may begin at operation 402, wherein dispatch logic writes a particular instruction to an ISQ. The particular instruction may be written to the ISQ after being received from an instruction fetch unit.

At operation 404, the processor reads a mapper to identify a producer ITAG and its destination STF tag. The producer is an older instruction that is producing one or more sources the particular instruction is dependent on. For example, the producer may write data to a register, and the received instruction may then read that data in order to perform its operations.

At decision block 406, the processor determines if the ready bit for the particular instruction is set. If the ready bit is not set (No at decision block 406), the producer has not executed. As such, the particular instruction waits for the producer to execute at operation 408. The particular instruction waits in the ISQ. When the producer has executed, the producer destination STF tag is written as the source STF tag for the particular instruction. This is shown at operation 410.

If the ready bit is set (Yes at decision block 406), the producer STF tag is written as the source STF tag for the particular instruction at operation 412.

At issue time for the particular instruction, the processor determines if there are any free STF tags available. This is shown at decision block 414. The processor may check an STF free list to determine if there are any STF tags available. If there is an STF tag available (Yes at decision block 414), which means that there is an available entry in the STF, one of the available STF tags is allocated to the particular instruction, and the particular instruction is executed. This is shown at operation 416.

After executing the particular instruction at operation 416, the processor performs a write back operation at operation 418. This is done so that any instructions that are dependent on the particular instructions receive their source STF tags so that they can also execute. The write back operation may include comparing the destination ITAG for the particular instruction to source ITAGs stored in the ISQ, the mapper, and the SRB. For each matching entry identified in the ISQ, the mapper, and the SRB, the destination STF tag for the particular instruction is written as the source STF tag, and the ready bits are set. After performing the write back at operation 418, the method 400 may end.

If there is no STF tag available for the particular instruction at issue time (No at decision block 414), the processor determines whether a flush criteria is met at decision block 420. The flush criteria may include one or more criterion that determine whether to flush the mapper and ISQ. The flush criteria may also determine a type of flush to perform. If the flush criteria are not met (No at decision block 420), the method 400 returns to decision block 414. If the flush criteria are met (Yes at decision block 420), the processor flushes out at least some instructions from the ISQ at operation 422. This frees up STF tags for the particular instruction, which can now be executed.

In some embodiments, after flushing out the instructions at operation 422, the previous state of the processor may be restored using the data stored in the SRB. This is shown at operation 424. After restoring the state of the processor, the method 400 may return to decision block 414. If the flush successfully freed up an STF tag (now Yes at decision block 414), the method may then proceed through operations 416 and 418. However, if the flush failed to free up an STF tag (still No at decision block 414), the method 400 may again progress through decision block 420 and operations 422 and 424.

Figure 5:
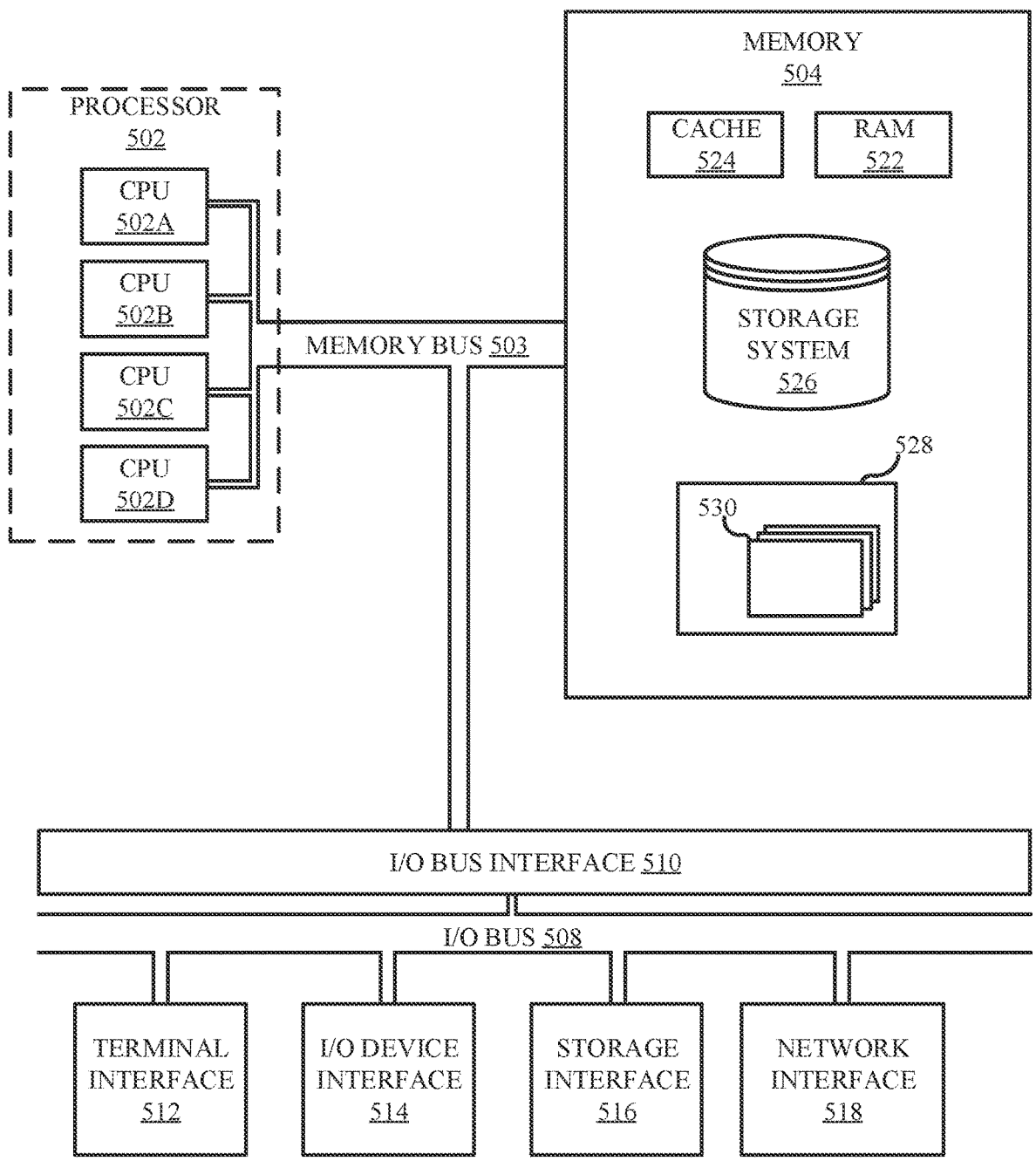
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that the aforementioned advantages are example advantages and should not be construed as limiting. Embodiments of the present disclosure can contain all, some, or none of the aforementioned advantages while remaining within the spirit and scope of the present disclosure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications, alterations, and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Additionally, it is intended that the following claim(s) be interpreted as covering all such alterations and modifications as fall within the true spirit and scope of the invention.

What is claimed is:

1. A method comprising:
   receiving an instruction for execution by a microprocessor;
   dispatching the instruction to an issue queue without assigning a register tag to the instruction;
   determining that the instruction is ready to issue;
   assigning, in response to determining that the instruction is ready to issue, an available register tag to the instruction;
   issuing the instruction;
   determining that a register tag is not available for a next to complete (NTC) instruction;
   performing, in response to determining that a flush criteria has been met, a partial flush of younger instructions from the microprocessor pipeline to reclaim register tags, wherein the younger instructions were received by the microprocessor after the NTC instruction, wherein the partial flush comprises flushing two or more younger instructions from the microprocessor pipeline without flushing one or more other younger instructions from the microprocessor pipeline;
   assigning one of the reclaimed register tags to the NTC instruction; and
   issuing the NTC instruction.

2. The method of claim 1, wherein the instruction is dependent on a producer instruction, and wherein determining that the instruction is ready to issue comprises:
   determining that a ready bit for the instruction is set.

3. The method of claim 2, wherein a source register tag for the instruction identifies an entry in a register file that contains a register location that the instruction needs to execute.

4. The method of claim 2, wherein the ready bit identifies whether the producer instruction has already executed.

5. The method of claim 1, the method further comprising:
   comparing, after issuing the instruction, an ITAG for the instruction to source ITAGs of other instructions in the issue queue;
   identifying, based on the comparing, a second instruction that is dependent on the instruction; and
   writing the register tag assigned to the instruction to a source register tag field for an entry for the second instruction in the issue queue, to an entry for the second instruction in a mapper, and to an entry for the second instruction in a save and restore buffer.

6. A system comprising a microprocessor configured to perform a method comprising:

receiving, in a microprocessor pipeline, an instruction for execution;

dispatching the instruction to an issue queue without assigning a register tag to the instruction;

determining that the instruction is ready to issue;

determining that a register tag is not available for the instruction;

determining whether a flush criteria having a plurality of flush criterions has been satisfied;

performing, in response to determining that the flush criteria has been satisfied, a flush of one or more younger instructions from the microprocessor pipeline to reclaim one or more register tags, wherein the one or more younger instructions were received by the microprocessor after the instruction, wherein a type of flush to be performed is dependent upon which flush criterion are satisfied, wherein the types of flush include a full flush of younger instructions in the microprocessor pipeline and a partial flush of younger instructions in the microprocessor pipeline;

assigning a reclaimed register tag to the instruction; and issuing the instruction.

7. The system of claim 6, wherein the instruction is dependent on a producer instruction, and wherein determining that the instruction is ready to issue comprises:

determining that a ready bit for the instruction is set.

8. The system of claim 7, wherein a source register tag for the instruction identifies an entry in a register file that contains a register location that the instruction needs to execute.

9. The system of claim 7, wherein the ready bit identifies whether the producer instruction has already executed.

10. The system of claim 6, wherein the method further comprises:

comparing, after issuing the instruction, an ITAG for the instruction to source ITAGs of other instructions in the issue queue;

identifying, based on the comparing, a second instruction that is dependent on the instruction; and writing the register tag assigned to the instruction to a source register tag field for an entry for the second instruction in the issue queue, to an entry for the second instruction in a mapper, and to an entry for the second instruction in a save and restore buffer.

11. The system of claim 6, wherein determining that the instruction is ready to issue comprises:

determining that the instruction is a next to complete instruction; and determining that all instructions that the instruction is dependent on have issued.

12. The method of claim 1, wherein determining that the flush criteria has been met comprises:

determining that the NTC instruction has not received a register tag for a number of processor cycles; and determining that the number of processor cycles exceeds a threshold.

13. The method of claim 1, wherein determining that the flush criteria has been met comprises:

determining a rate at which instructions are being issued; and determining that the rate is below a threshold.

14. The method of claim 1, wherein determining that the flush criteria has been met comprises:

determining a number of register tags that are in a free list; and determining that the number of register tags that are in the free list is below a threshold.

15. The method of claim 1, wherein performing the partial flush comprises:

flushing out N younger instructions starting from a head pointer—N.

16. The system of claim 6, wherein the method further comprises:

maintaining, by the microprocessor, a free list of register tags that are available to be assigned to instructions and a reserve register tag for assigning in response to detecting that there are no available tags in the free list for a next to complete (NTC) instruction;

receiving a second instruction, wherein the second instruction is the NTC instruction;

determining that there is no available register tag in the free list of register tags for the second instruction;

assigning the reserve register tag to the second instruction; and issuing the second instruction.

17. A method comprising:

receiving, in a microprocessor pipeline, an instruction for execution by a microprocessor;

dispatching the instruction to an issue queue without assigning a register tag to the instruction;

maintaining, by the microprocessor, a free list of register tags that are available to be assigned to instructions and a reserve register tag for assigning in response to detecting that there are no available tags in the free list for a next to complete (NTC) instruction;

determining that the instruction is the NTC instruction;

determining that a register tag is not available in the free list for the instruction;

assigning the instruction to a reserve entry in a register file; and issuing the instruction.

18. The method of claim 17, the method further comprising:

receiving a second instruction for execution by the microprocessor;

determining that the second instruction is the NTC instruction;

determining that a register tag is not available in the free list for the instruction and that the reserve register tag is not available;

performing a flush of younger instructions from the microprocessor pipeline to reclaim one or more register tags;

assigning a reclaimed register tag to the second instruction; and issuing the second instruction.

19. The method of claim 18, wherein performing the flush of the younger instructions from the microprocessor pipeline comprises:

determining that a flush criteria having a plurality of flush criterions has been satisfied, wherein a type of flush to be performed is dependent upon which flush criterion are satisfied.

20. The method of claim 18, wherein performing the flush of the younger instructions from the microprocessor pipeline comprises:

performing a partial flush of younger instructions from the microprocessor pipeline, wherein the younger instructions were received by the microprocessor after the second instruction, wherein the partial flush comprises flushing one or more younger instructions from the microprocessor pipeline without flushing one or more other younger instructions from the microprocessor pipeline.

* * * * *